I. M. Williams.
Tire Heater.
Nº 97,740. Patented Dec. 7, 1869.
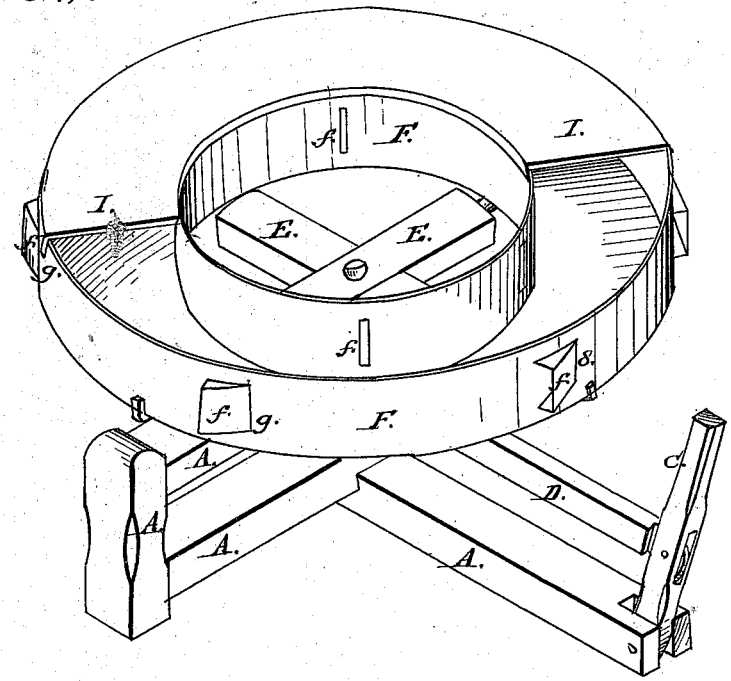
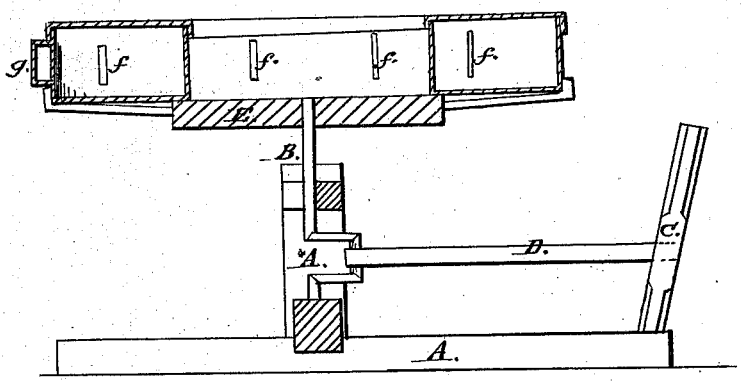
Witnesses:
R. K. Evans
L. C. Evans
Inventor:
Isaiah M. Williams
per A. K. Evans
attorney.

United States Patent Office.

ISAIAH M. WILLIAMS, OF CLINTON COUNTY, OHIO.

Letters Patent No. 97,740, dated December 7, 1869.

IMPROVED TIRE-HEATER.

The Schedule referred to in these Letters Patent and making part of the same

*To all whom it may concern:*

Be it known that I, ISAIAH M. WILLIAMS, a citizen of Clinton county, and State of Ohio, have invented a new and useful Improvement on Tire-Heaters; and I do hereby declare that the following is a full, clear, and exact description of the construction and operation of the same, reference being had to the annexed drawings, making a part of this specification, in which—

Figure 1 is a perspective view.

Figure 2, a sectional view, through the centre.

The nature of my invention consists in providing a means for a convenient and rapid mode of heating tire, by producing rapid and equal combustion around it.

To enable others skilled in the art to make and use my invention, I will proceed to describe its construction and operation.

I construct a strong frame, A, of wood, or other suitable material, through the centre of which passes the vertical crank-shaft B, worked by the lever C, through the horizontal beam D.

On the top of the shaft B are pivoted the revolving cross-beams, or platform E, on which rests a round cast-iron or other suitable box, F, large enough to receive the tire and fuel for heating.

This box is supplied with a series of ventillators, $f$ $f$, those on the outer circle of the box being covered with ears or buckets, $g$ $g$, so as to increase the draught within the box F, as it revolves.

I is the cover of the box F.

What I claim as my invention, and desire to secure by Letters Patent, is—

1. The box F, in combination with the ventilators $f$ $f$, and the ears or buckets $g$ $g$, constructed and operating substantially as and for the purpose described.

2. The revolving platform E, in combination with the crank B, horizontal beam D, and lever C, constructed and operating substantially as and for the purpose described.

3. In combination with the revolving platform E, crank B, lever C, and beam D, the box F, with ventilators $f$ $f$, and ears or buckets $g$ $g$.

ISAIAH M. WILLIAMS.

Witnesses:
S. R. NICKERSON,
A. N. WILLIAMS.